United States Patent [19]

Otto

[11] Patent Number: 5,031,741
[45] Date of Patent: Jul. 16, 1991

[54] SYNCHRONOUS COUPLING WITH LOCKING MEANS

[75] Inventor: Stadeli Otto, Menzingen, Switzerland

[73] Assignee: Maag Gear-Wheel & Machine Company Limited, Zurich, Switzerland

[21] Appl. No.: 448,927

[22] Filed: Dec. 12, 1989

[30] Foreign Application Priority Data

Dec. 22, 1988 [CH] Switzerland ............... 4748/88

[51] Int. Cl.$^5$ ............................................. F16D 23/02
[52] U.S. Cl. ................................. 192/53 H; 192/67 A
[58] Field of Search ............... 192/53 H, 67 A, 53 R, 192/94

[56] References Cited

U.S. PATENT DOCUMENTS

| 1,862,188 | 6/1932 | Legge | 192/53 H |
| 4,069,903 | 1/1978 | Clements et al. | 192/67 A |
| 4,489,816 | 12/1984 | Sigg | 192/53 H |
| 4,562,909 | 1/1986 | Sigg et al. | 192/67 A |

Primary Examiner—Allan D. Herrmann
Assistant Examiner—Andrea Pitts
Attorney, Agent, or Firm—Bachman & LaPointe

[57] ABSTRACT

The invention relates to a synchronous coupling with a straight-toothed coupling hub, a coupling star which is axially displaceable in relation thereto and is in engagement therewith. A synchronizing sleeve is held axially in the coupling star and is in engagement with it through ratchet teeth. The sleeve is in engagement with an output shaft for axial displacement thereon through a course thread wherein locking teeth on a locking sleeve can be brought into engagement with corresponding locking teeth on the coupling star. Screw-in teeth are provided at the driving shaft side and at the coupling star side. For the transmission of torque without problems in both directions of rotation, the locking sleeve is provided in engagement with the output shaft for axial adjustment thereon via adjusting teeth through a predetermined axial stroke relative to the driving shaft for interlocking the locking teeth together.

7 Claims, 2 Drawing Sheets

SYNCHRONOUS COUPLING WITH LOCKING MEANS

BACKGROUND OF THE INVENTION

The present invention relates to a synchronous coupling and, more particularly, a synchronous coupling having locking means.

With mechanically synchronized jaw couplings known in the prior art, for example from CH-PS 499735, driving engines or motors can be automatically coupled or uncoupled without the speed or the torque having to be monitored. In these cases, during synchronous operation, a synchronizing sleeve is displaced axially by ratchet teeth and during the engagement a screwing-in movement is transmitted via a pawl to a coupling star. As a result of this, helical screw-in teeth come into engagement and, after reaching an axial stop, transmit the torque.

The disengagement process for the coupling is initiated on a change in direction of rotation or acceleration of the output. This can be prevented, however, if the coupling star and the output shaft are positively connected to one another through adjusting teeth and locking teeth each constructed in the form of straight teeth.

A disadvantage in these cases, however, is that the locking teeth form a joint in the mechanical sense. As a result of the foregoing, during reverse operation, the torque is transmitted via the mechanically indeterminate double joint which is formed from the locking teeth and coupling teeth. This mode of operation is therefore only reliable for a short time. Alternating operating torques cannot be permitted to occur frequently because of the risk of wear of the teeth and of the synchronizing sleeve mounting.

A further coupling device is known from DE-OS 2430615 wherein an axial coupling consisting of two parts which are movable axially in relation to one another and an intermediate member transmitting torque wherein provided between the intermediate member and each of the two coupling parts are helical teeth which have a different pitch and are so directed that on the transmission of torque, a force develops which pulls the parts of the coupling together. In this case, the centering is effected via corresponding tapered surfaces on the coupling parts. In this case, the transmission of torque is only possible in one direction.

Accordingly, it is the primary object of the present invention to provide a synchronous coupling which is of simple construction and which permits operation with alternating torques without suffering from the disadvantages noted above.

SUMMARY OF THE INVENTION

The foregoing object is achieved by way of the present invention wherein a synchronized coupling comprises an output shaft having first screw-in teeth wherein a synchronizing sleeve is mounted on the output shaft via a coupling comPrising a course thread for connecting the output shaft to the synchronizing sleeve so that the synchronizing sleeve is rotatable therewith and axially displaced thereon. A coupling star is mounted on the synchronizing sleeve. The coupling star is provided with second screw-in teeth for selectively engaging the first screw-in teeth on the output shaft. The coupling star further includes first locking teeth for engaging second locking teeth provided on the output shaft. The coupling star is connected to the synchronizing sleeve by way of a second coupling comprising a ratchet tooth and pawl arrangement such that the coupling star is selectively rotatable with the synchronizing sleeve and fixed thereon for axial movement with the synchronizing sleeve between a first position wherein the first screw-in engaging teeth and the second screw-in engaging teeth are engaged in a locked state. A locking sleeve is prOvided on the output shaft and movable thereon for selectively engaging locking teeth provided on the coupling star. The arrangement of the present invention allows for torque to be evenly distributed between both sets of teeth.

The synchronous coupling of the present invention can be used, for example, in chips' drive units with multi-purpose or reversing drives, since two synchronous couplings connected in series can transmit torque or free-wheel independently of the direction of rotation, depending on the kind of drive (cruising speed, slow speed or reversal of the propeller thrust). Such synchronous couplings can also be used in connection with hydraulic starting couplings which are mechanically short-circuited in rated-load operation.

BRIEF DESCRIPTION OF THE DRAWINGS

The invention is explained in more detail below with reference to an example of the embodiment illustrated in the accompanying figures.

DETAILED DESCRIPTION

Figure 1:
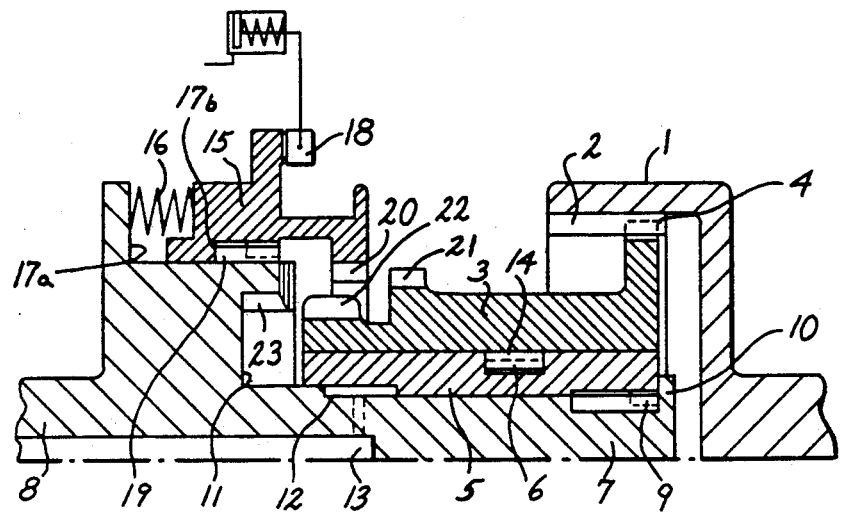
FIG. 1 shows diagrammatically and in section, a toothed coupling with the locking device in the free-wheel position.

The coupling illustrated in FIG. 1 comprises a coupling hub 1 at the drive side of the coupling having internal straight teeth 2 which are in engagement through corresponding straight teeth 4 with a coupling star 3 which is axially displaceable in relation to the coupling hub 1 or synchronizing sleeve 5. The synchronizing sleeve 5 which is rotatable relative to the coupling star as will be explained hereinbelow is in engagement with the coupling star 3 through coupling means comprising ratchet teeth 6. The synchronizing sleeve 5 through teeth 6 fixes the coupling star 3 axially. The synchronizing sleeve 5 is fixed for rotation and axially displaceable on hollow shaft portion 7 of an output shaft 8 and is in engagement with the latter through coupling means comprising a course thread 9. The hollow shaft portion 7 has a collar 10 adjacent to the coupling hub 1 and a stop 11 at the opposite end, which limits the joint axial stroke to a predetermined length for the synchronizing sleeve 5 and of the coupling star 3. Between the hollow shaft portion 7 and the synchronizing sleeve 5 there is an annular chamber 12 which is connected to the interior of the hollow shaft portion 7 via a bore 13 through which oil is fed.

The coupling star 3 comprises one or more chambers distributed over the interior circumference thereof in which pawls 14 are inserted either loose or prestressed by springs in known manner. The noses of the pawls 14 are urged gently towards the ratchet teeth 6 by the action of centrifugal force and/or prestressing by springs. So long as the synchronizing sleeve 5 is rotating faster than the coupling hub 1, the ratchet teeth 6 slide freely away under the pawls 14. If the relative speed is reversed, however, that is to say if the coupling hub 1 begins to rotate faster than the synchronizing sleeve 5, one of the pawls 14 immediately catches in the ratchet teeth 6 and establishes a positive connection between the coupling hub 1 and the synchronizing sleeve 5.

A locking sleeve 15 is provided which is axially displaceable and radially located in relation to the output shaft 8. The locking sleeve 15 is axially displaceable, against the bias of springs 16, through a predetermined stroke towards a stop 17a on the output shaft 8 by an external actuating force. The actuating force is exerted, for example, by a hydraulically actuated shift fork 18 or a hydraulically actuated eccentric. The locking sleeve 15 is in engagement with the output shaft 8 through coupling means comprising adjusting teeth 19. Springs 16 bias the locking sleeve 15 to its rest position, illustrated in FIG. 1, against stop 17b formed by adjusting teeth 19. In addition, at an axial distance from adjusting teeth 19, locking sleeve 15 is provided with locking teeth 20 which can be selectively brought into engagement with corresponding locking teeth 21 on the coupling star 3 in a manner described hereinbelow.

The coupling star 3 has, at its end adjacent to the stop 11 of output shaft 8, screw-in teeth 22 which are selectively engaged with corresponding screw-in teeth 23 on the output shaft 8. Both sets of screw-in teeth 22 and 23 are beveled at their ends.

The locking teeth 20, 21 and the adjusting teeth 19 are helical teeth such that the locking teeth 20, 21 and the screw-in teeth 22, 23 form herring-bone teeth configuration in their locked state.

Let it be assumed that the driving shaft with the coupling hub 1 is stationary and the coupling star 3 is disengaged, that is to say, the screw-in teeth 22, 23 are out of engagement. The coupling star 3 with the pawls 14 is likewise not rotating. The output shaft 8 rotates together with the synchronizing sleeve 5 which rotates freely under the pawls 14. Oil pressure, produced by the rotation of the output shaft 8, prevails in the annular compartment 12 and holds the coupling star 3 in the disengaged position through the synchronizing sleeve 5.

If the driving shaft is now to be coupled to the output shaft 8, which is already rotating, the driving engine or motor is correspondingly accelerated. The synchronizing and engagement are effected in that the coupling hub 1 and the coupling star 3 are rotated by the pawls 14. As soon as the coupling hub 1 begins to rotate faster than the output shaft 8, the relative speed between the ratchet teeth 6 and the pawls 14 is reversed. One of the pawls 14 catches on any tooth of the ratchet teeth 6, establishes a positive connection between the coupling hub 1 and the synchronizing sleeve 5 and, as a result, causes a screwing movement of the synchronizing sleeve 5 and hence of the coupling star 3 in the direction of the stop 11, through the course thread 9 until the coupling star 3 pulls itself tight against the stop 11. The axial component of the screwing movement is transmitted from the synchronizing sleeve 5 to the coupling star 3 either directly or through a resilient member.

Figures 2A, 2B:
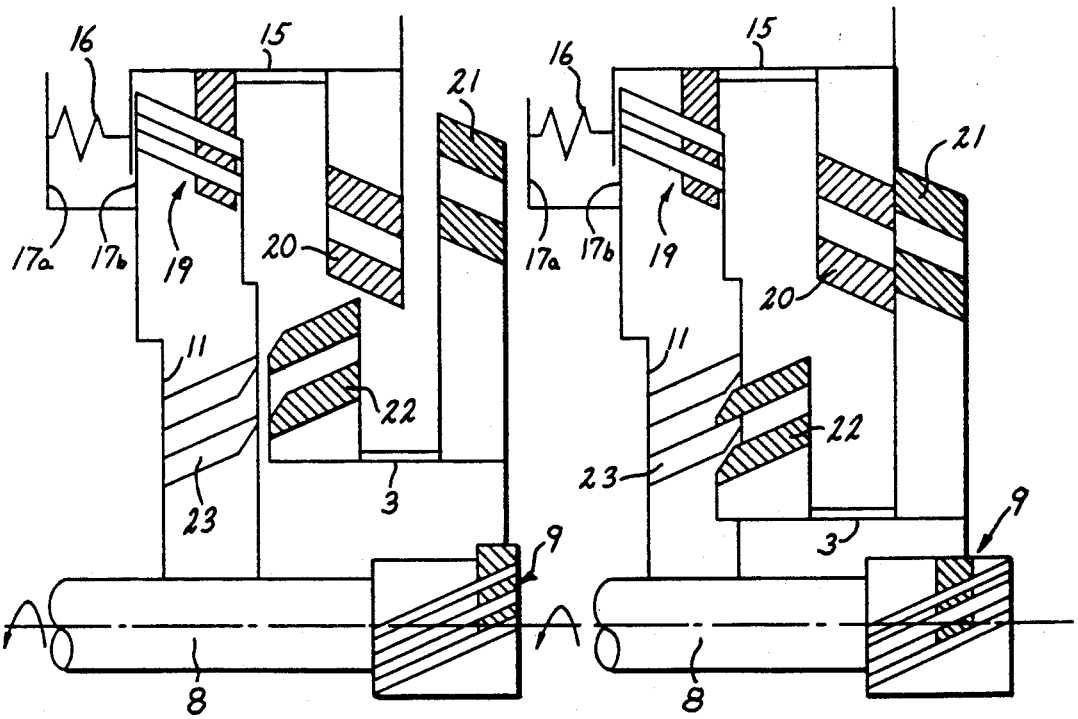
FIGS. 2a to 2f show diagrammatically the locking and unlocking operations respectively of the coupling of FIG. 1.
Figure 2C:
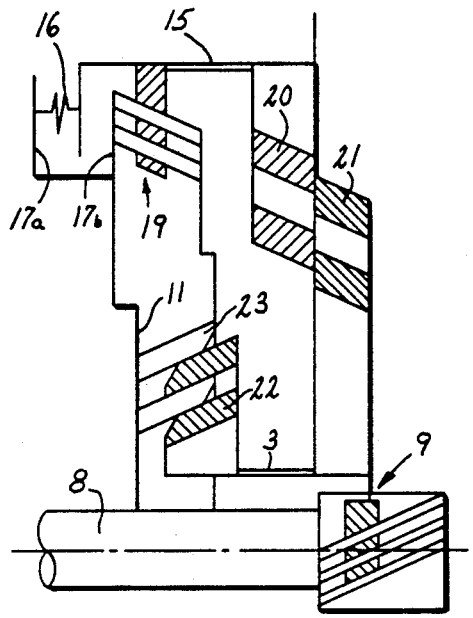
Figure 2D:
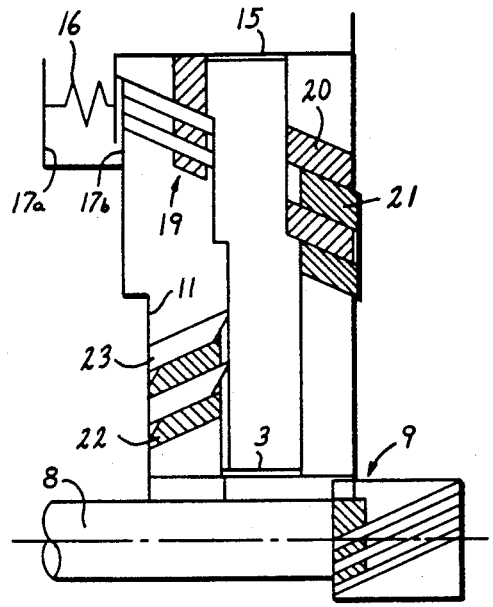

In the assumed initial state as illustrated in FIG. 2a, the locking sleeve 15 is in abutment against the stop 17b as a result of the spring prestressing acting on it. When the drive begins to overtake the output (FIG. 2b) and the coupling star 3 is moved helically, the screw-in teeth 22, 23 come into engagement while locking teeth 20, 21 come into abutment against one another so that the locking sleeve 15, which is guided by the adjusting teeth 19, is moved against the bias of spring 16 (FIG. 2c). When the screw-in teeth 22 reach the stop 11, a tooth in locking teeth 20, 21 is opposite a gap between the corresponding teeth in the locking teeth 20, 21. Thus, the locking sleeve 15 is urged back by the spring force so that the locking teeth 20, 21 are in engagement (FIG. 2d).

In the locked state, the screw-in teeth 22, 23 together with the locking teeth 20, 21 form a herring-bone toothing arrangement.

During forward operation, the transmission of torque is effected substantially via the screw-in teeth 22, 23 (FIG. 2c). During reverse operation, the torque is divided between the two sets of helical teeth 20, 21 and 22, 23 (FIG. 2d). With appropriate selection of the helix angle and taking into consideration the different sizes of the pitch diameters of the teeth, a substantially equal division of torque between the two sets of teeth can be achieved.

With the same helix angles, the coupling star 3 can adjust itself freely axially, the axial forces produced by the angles of the teeth act in opposite directions. They center the coupling star 3 which thus remains rigidly connected to the driving side of the coupling even during reverse operation. The self-centering action of the herring-bone teeth formed, locates the coupling star 3 in the radial direction; plain bearings which are provided in the region of the ratchet teeth 6 are relieved of load.

Figure 2E:
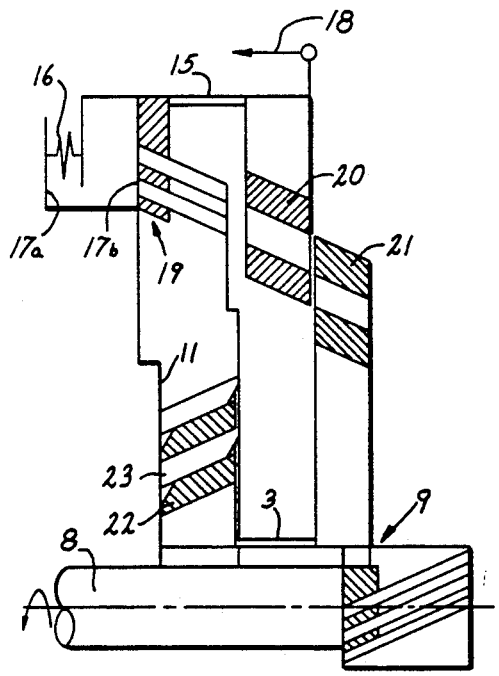
Figure 2F:
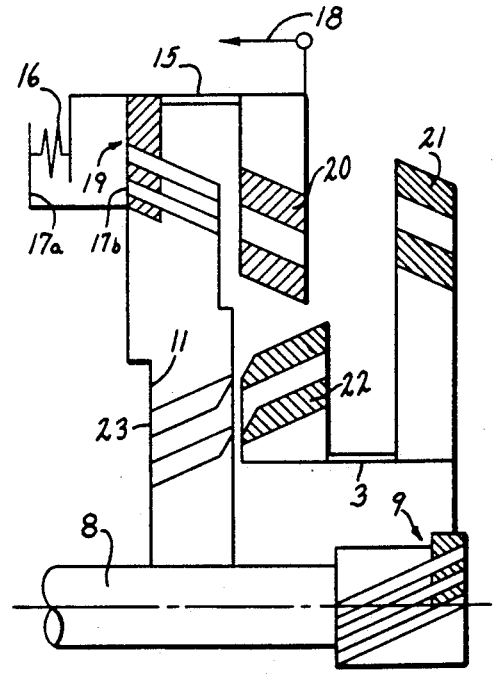

The disengagement operation is initiated with the non-working flanks of the screw-in teeth and the locking teeth 20, 21, 22, 23 relieved of load. The locking sleeve 15 is disengaged by the external actuating force (shift fork 18), FIG. 2e. On acceleration of the driving side, the coupling star 3 is disengaged through the ratchet teeth 6, FIG. 2f. After the external actuating force has been discontinued, the locking sleeve 15 is again ready for operation.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A synchronous coupling comprising:
    an output shaft having first screw in engaging means;
    a synchronizing sleeve mounted on said output shaft;
    first coupling means for connecting said output shaft to said synchronizing sleeve wherein said synchronizing sleeve is rotatable with said output shaft and axially displaced thereon;
    a coupling star mounted on said synchronizing sleeve, said coupling star being provided with second screw-in engaging means for selectively engaging said first screw-in engaging means on said output shaft, first locking teeth and engagement teeth;
    second coupling means for connecting said coupling star to said synchronizing sleeve wherein said coupling star is selectively rotatably with said synchronizing sleeve and fixed thereon for axial movement therewith between a first position wherein said first screw-in engaging means and said second screw-in engaging means are engaged in a locked state and a second position wherein said first screw in engaging means and said second screw in engaging means are disengaged in an unlocked state;

a drive shaft having a coupling hub drivingly connected to said engagement teeth on said coupling star for transferring rotary motion thereto;

a locking sleeve having second locking teeth for selectively engaging said first locking teeth on said coupling star; and a third coupling means for connecting said output shaft to said locking sleeve wherein said locking sleeve is rotatable with said output shaft and axially displaceable thereon between a first position and a second position wherein said second locking teeth on said locking sleeve engage in a locked state with said first locking teeth on said coupling star when said coupling star is in said first position and said locking sleeve is in said first position wherein the transmission of torque during the forward operation is effected via said first and second screw-in means and during reverse operation the torque is divided between the first and second screw-in means and the first and second locking teeth.

2. A synchronous coupling according to claim 1 wherein said first and second locking teeth and said first and second screw-in teeth are helical teeth which together form with each other a herring-bone pattern when in their locked state.

3. A synchronous coupling according to claim 2 wherein the helical teeth have a helix angle such that torque is divided equally between both sets of the helical teeth when in the locked state.

4. A synchronous coupling according to claim 3 wherein the helix angles of the helical teeth are the same.

5. A synchronous coupling according to claim 1 wherein biasing means continually urges said locking sleeve toward said first position.

6. A synchronous coupling according to claim 5 wherein said biasing means comprises spring means.

7. A synchronous coupling according to claim 5 wherein motor means biases said locking sleeve to said second position in opposition to said biasing means for disengaging said first and second locking teeth.

* * * * *

UNITED STATES PATENT AND TRADEMARK OFFICE
CERTIFICATE OF CORRECTION

PATENT NO. : 5,031,741
DATED : July 16, 1991
INVENTOR(S) : Otto Stadeli

It is certified that error appears in the above-identified patent and that said Letters Patent is hereby corrected as shown below:

On the title Page, the inventor's name under "United States Patent [19]" should read --STADELI--.

On the title Page, the inventor's name after "[75] Inventor:" should read --Otto Stadeli--.

In Column 4, line 61, "rotatably" should read --rotatable--.

Signed and Sealed this

Eighth Day of December, 1992

Attest:

DOUGLAS B. COMER

Attesting Officer     Acting Commissioner of Patents and Trademarks